March 21, 1950 J. J. DUKET 2,501,214
LINE-TIGHTENER MEANS
Filed Jan. 12, 1946

INVENTOR
John J. Duket
By Geo E King
Atty

Patented Mar. 21, 1950

2,501,214

UNITED STATES PATENT OFFICE 2,501,214

LINE-TIGHTENER MEANS

John J. Duket, Toledo, Ohio

Application January 12, 1946, Serial No. 640,770

2 Claims. (Cl. 254—161)

This invention relates to bracket devices for engaging or holding an end or intermediate portion of a wire, rope or cord, especially as stranded, with adaptation for wrapping or tightening to adjust for the extent or tension of the reach theretoward.

This invention has utility when incorporated in a metal strap bracket providing a sleeve, and a relatively rotatable line-engaging forked pin in the sleeve and adapted to be angularly locked therewith into taut line holding position.

Referring to the drawings.

Figure 1:
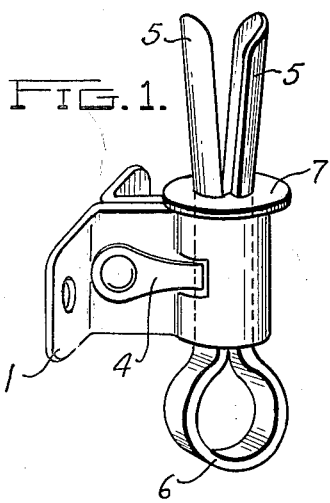
Fig. 1 is a perspective view of an embodiment of the invention wherein the elements are of sheet metal assembled in cooperative relation.
Figure 2:
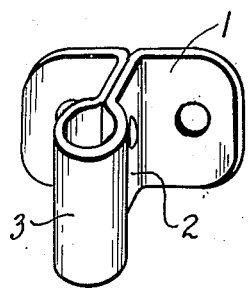
Fig. 2 is a perspective view of the fixed bracket or mounting element for the device of Fig. 1.
Figure 3:
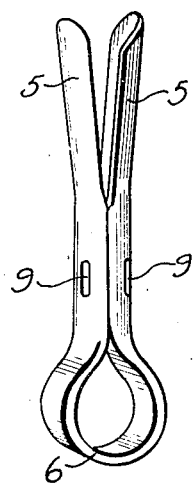
Fig. 3 is a perspective view of the line-engaging element of the device, relatively shiftable as to the mounting to take up slack in a line engaged thereby.
Figure 4:
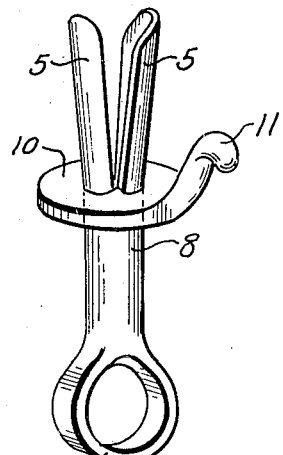
Fig. 4 is a perspective view of a modified form of the invention as a rigid unit.

In carrying out the invention, a sheet metal strip is formed into a mounting bracket comprising a pair of base portions or end flanges 1 in a common plane with abutting parallel offset portions 2 therefrom to a medial sleeve or bearing portion 3. Screws or nails thru the openings in the flanges 1 may serve to fixedly mount the bracket on a building, post or other desired location, as for a clothes line. A rivet clamping the parallel offset portions 2 into a rigid assembly for holding the bearing 3, in addition to that effected by the mounting means at the flanges 1, has a spring finger or check 4 on this rivet which extends toward the bearing 3. The wall of the bearing 3 has an opening into which the free outer end of this check 4 extends.

A second sheet metal element is provided which is adapted to be assembled in the bearing 3. This second element is medially folded on itself with the opposing sides concaved toward each other to fit into the bearing 3 and with the ends upward and flaring providing diverging line-pinching prongs 5. Oppositely, or on the lower side of the bearing 3, the medial bend portion forms a loop or eye 6, which may be grasped as a handle, or have a bar thrust thereinto to act as a lever. To seat on the upper end of the bearing 3 is a disk 7 having the prongs 5 upwardly protruding therethrough and in their spread relation upward from cylindrical bearing portion 8 in the sleeve 3 result in having the disk 7 serve as a retaining collar. There is thus provided a holding assembly for the grip or prong-carrying element in the mounting. Looking at the bearing 3 from its lower side and turning the loop 6 clockwise, the spring or check 4 has its free end extending through the opening in the sleeve 3, engaging serrated portions or notch seats 9 in the portion 8. There is thus provided a spring holding means against counterclockwise turning of the prong pair as a line may be seated and pinched between the diverging prongs 5.

In the operation of the device, the line is engaged between the prongs 5 where it is held by being pinched between the diverging concave prongs. In order to take up slack in the line, or increase its taut condition, turning of the loop 6 relatively to the direction of the line through the prongs 5 causes the line outward from the prongs to start wrappings oppositely around the outside of the prongs 5. To hold the line wraps from rising or slipping over the free ends of the prongs 5, especially if there be no mounting for the device to sustain the downward tendency of a load on the line, there may be substituted for the disk 7 a flange or disk 10 fixed with the portion 8. Then with a hook 11 to engage over a line wrap from about the prongs 5 there is an embodiment of the device which may be used independent of a mounting bearing as anchoring means.

What is claimed and it is desired to secure by Letters Patent is:

1. A line tightener device comprising a sheet metal mounting bracket providing medially of its extent a bearing sleeve having a lateral opening thereinto and parallel offsets from the sleeve to oppositely extending flange portions in a common plane adapted to be anchored in locating the device in position for use, a second sheet metal strip medially of its extent having a loop and therefrom portions concaved toward each other to provide a cylindrical bearing with flare prongs to the ends of the strip remote from the loop, said cylindrical bearing being mounted in said bearing sleeve and having serrations, a disk about the prongs above the bearing, the disk being there held by the spreading prongs, and a spring check mounted on the offsets and extending into the sleeve opening to engage a serration for holding the loop-bearing-prong formed strip for one direction of turning relatively to the bracket.

2. A line tightener device element having an eye at one end, remote therefrom spreading fork portions concave toward each other to provide a pair of flare prongs, the intermediate portion of the element being cylindrical, a disk about the prongs above the cylindrical portion and fixed with the prongs, whereby a line to be tightened may be gripped between the prongs and wrapped thereabout by turning the device with the flare of the prongs thrusting the line toward the disk, there being coacting holding means on the disk whereby to engage the line after wrapping to retain the line taut.

JOHN J. DUKET.

REFERENCES CITED

The following references are of record in the file of this patent:

UNITED STATES PATENTS

| Number | Name | Date |
|---|---|---|
| 170,597 | Schartan et al. | Nov. 30, 1875 |
| 532,811 | Norton | Jan. 22, 1895 |
| 577,754 | Jackson | Feb. 23, 1897 |
| 2,152,090 | Pryne | Mar. 28, 1939 |

FOREIGN PATENTS

| Number | Country | Date |
|---|---|---|
| 36,907 | France | Sept. 6, 1930 |